United States Patent Office 2,778,136
Patented Jan. 22, 1957

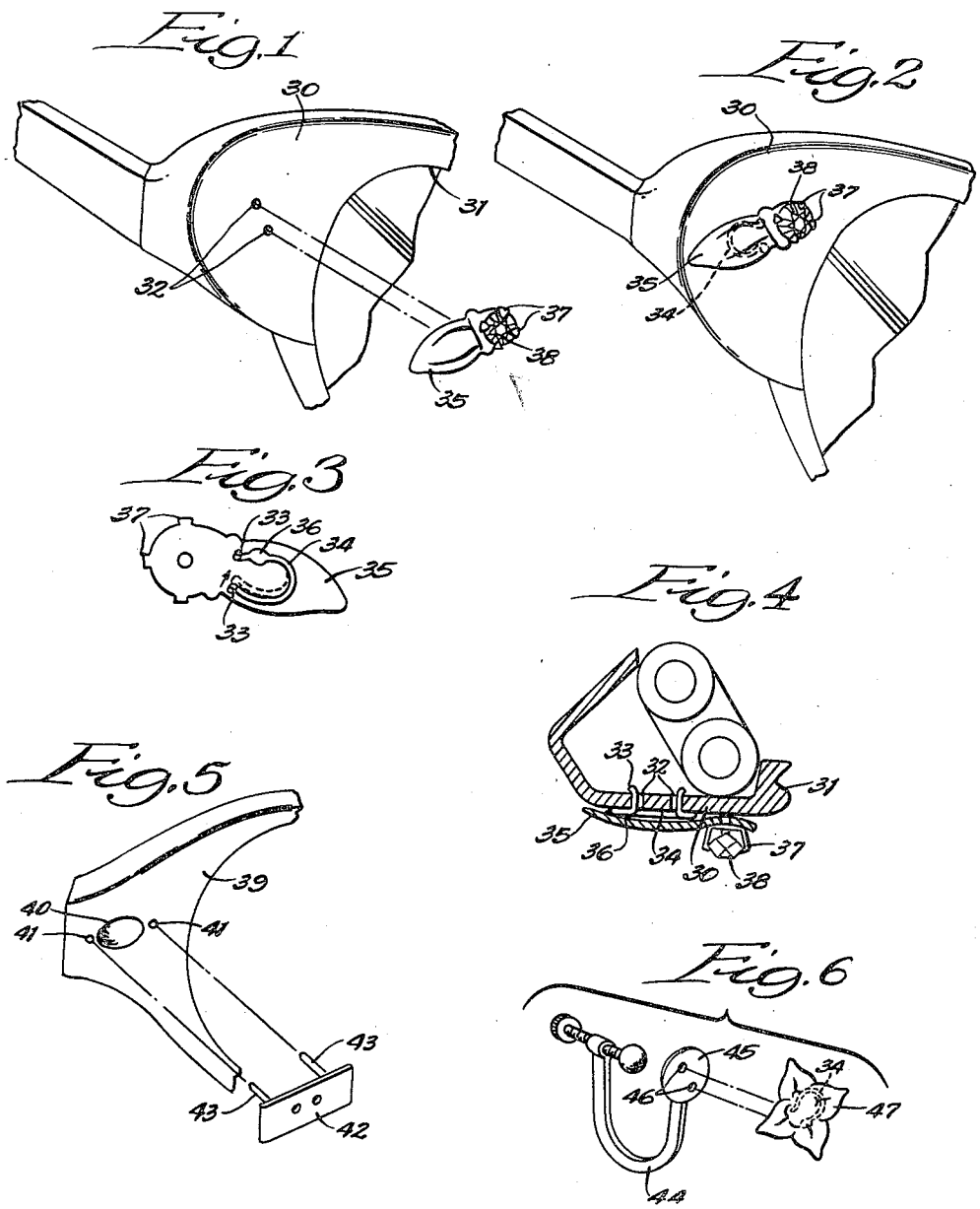

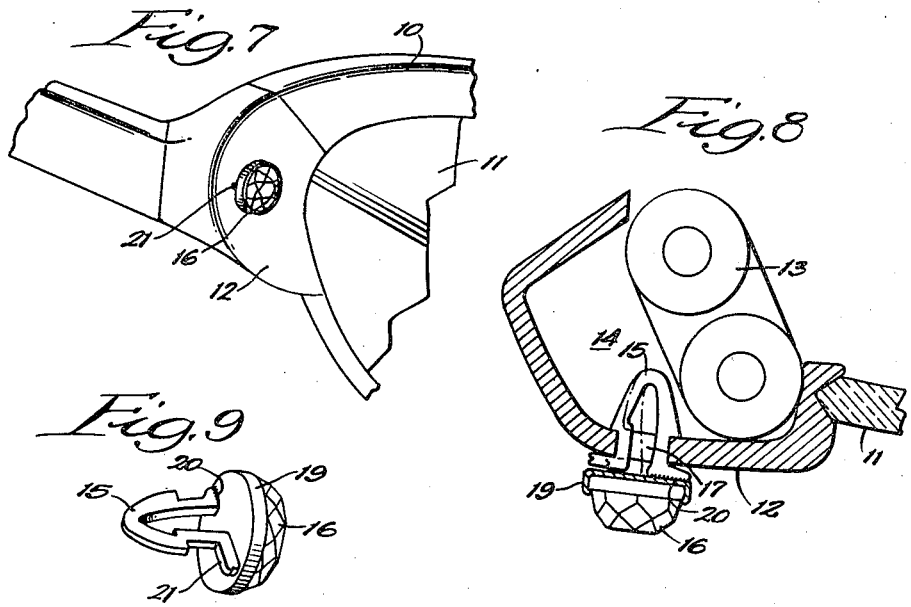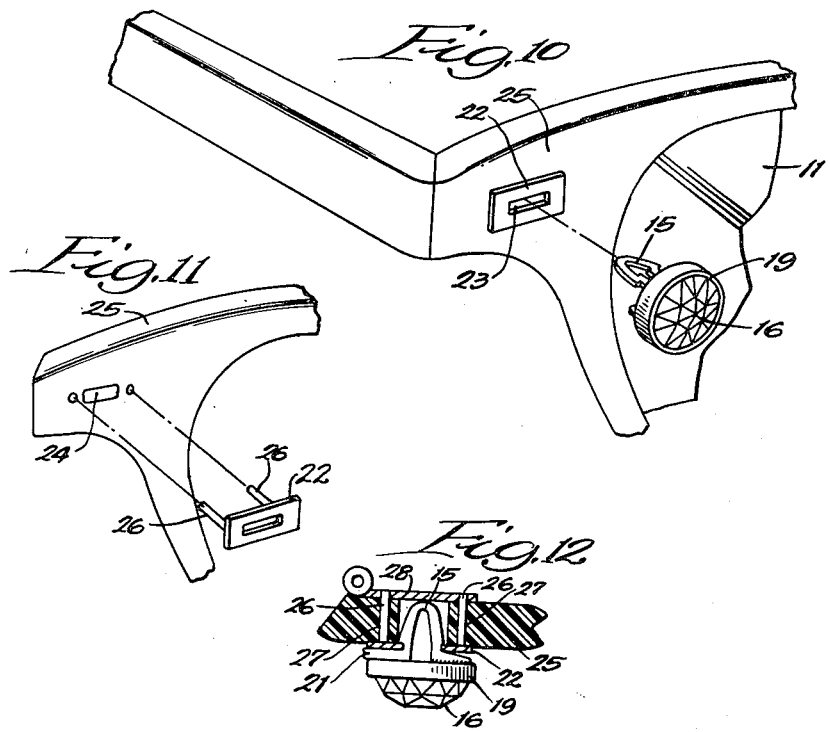

2,778,136
ORNAMENTATION OF PLAQUES
Austin B. Belgard, Evanston, Ill.

Application November 20, 1953, Serial No. 393,373

4 Claims. (Cl. 41—34)

This invention relates to the ornamentation of plaques. The invention is particularly useful in the ornamentation of spectacle frames and plaques used for various other purposes.

An object of the invention is to provide a plaque in which means are provided for releasably attaching elements to the plaques. A further object is to provide a combined plaque and ornament structure in which the ornament may be attached with a minimum of effort and structural parts to the plaque or structural body. A still further object is to provide, in combination with a spectacle frame, or the like, means for releasably securing elements thereon such as ornaments, etc. Other specific objects and advantages will appear as the specification proceeds.

The invention is shown, in an illustrative embodiment, by the accompanying drawings, in which Figure 1 is a perspective view of a spectacle frame and an ornament adapted to be attached thereto; Fig. 2, a perspective view of the ornament assembled with the frame; Fig. 3, a bottom plan view of the ornament and the means for attaching the same to the frame; Fig. 4, a transverse sectional view of the structure shown in Fig. 2; Fig. 5, a perspective view of a modified structure in which a retaining plate is adapted to be attached to a spectacle frame for the purpose of retaining an ornament thereon; Fig. 6, a perspective view of an ear ring and an ornament adapted to be attached to the plaque thereof; Fig. 7, a broken, perspective view of a portion of a spectacle frame equipped with means embodying my invention; Fig. 8, an enlarged sectional view of the structure shown in Fig. 1; Fig. 9, a perspective view of a detachable element or ornament device adapted to be secured upon the end portion of the spectacle frame; Fig. 10, a view similar to Fig. 7 but showing a modified form of the invention by which the ornament element may be attached to an endpiece of a plastic eyeglass frame; Fig. 11, a view similar to Fig. 10 but showing the shield or plaque employed with the frame, the plaque being shown as a detached structure; and Fig. 12, a sectional view showing the attachment of the ornament element to the structure shown in Figs. 10 and 11.

In the illustration given in Figs. 7, 8 and 9, 10 designates a portion of a plastic frame enclosing the lens 11. A plastic frame has presented a problem with respect to ornamentation because of the thick, heavy structure employed and the difficulty of securing parts releasably thereto. In the structure shown in Figs. 7 to 9, inclusive, I have secured to the endpiece of the frame 10 a metal plaque 12 enclosing the hinge structure 13 to which the temple of the eyeglass frame is secured. The metal plaque provides at the rear of the hinge structure 13 a space 14 adapted to receive the inner spring catch portion 15 of an ornament 16. The front wall of the plaque 12 is provided with an aperture or slot 17, through which the spring catch or tongue 15 of the ornament extends. The ornament may be of any suitable construction. In the illustration given, 18 designates a jewel secured upon a base plate 19. To the base plate 19 is secured by welding at 20, the spring tongue or catch 15. The other leg 21 of the spring member 15 is unattached to the plate 19 and is free to move relative thereto.

In the operation of the structure shown in Figs. 7, 8 and 9, inclusive, the ornamental element may be extended through the slot 17 of the plaque wall 12 by compressing the free leg 21 inwardly and then the leg may be released so as to secure the tongue 15 in position, as illustrated in Fig. 8. Similarly, the free leg 21 may be pressed inwardly to release the catch 15 from the plaque 12, and the same may be removed. The wearer of the glasses may attach and remove ornaments to the end plaques of the frame as these may be desired from time to time, and such ornaments relieve the heavy character of the plastic frames 10, while at the same time being set out with the metal base or plaque 12 forming a background.

In the modification shown in Figs. 10, 11 and 12, inclusive, a shield or plaque 22 provided with an opening 23 therein is secured over a slot or recess 24 formed within the plastic endpiece 25. Pins 26 welded to the plaque or shield 22 are extended through openings 27 drilled through the plastic endpiece 25 and the ends of the pins may be secured to a back plate 28 by soldering, riveting, or by any other suitable means. With the structure shown, the shield or plaque 22 provides at the front of the endpiece 25 a plate for receiving the catch 15 of the ornament 16 and the same may be secured within or removed from the plaque 22 in the same manner as that described in connection with Figs. 7 to 9, inclusive.

In the structure shown, the shield 22 is itself decorative, and the glasses may be worn with or without ornaments. When it is desired to attach the ornaments, the spring tongue 15 may be pressed quickly into the space behind the plate 22 to secure it in locking position as illustrated in Fig. 12, and the same may be removed by simply springing the free leg 21 of the catch member 15 inwardly, as heretofore described.

In the structures shown in Figs. 1 to 6, inclusive, I provide a simplified arrangement in which a smaller recess is required for the plaque to which the ornament is to be attached. In this form of structure, I provide a retaining element which is characterized by having the main portion of the spring legs thereof lying flat against the plaque and thus occupying a minimum of space, while at the same time the elongated legs may be sprung laterally for attachment or detachment of the ornament from the plaque.

In the illustration given in Figs. 1 to 4, inclusive, the plaque portion 30 of the eyeglass frame 31 is provided with a pair of spaced openings 32. These openings are adapted to receive the laterally-turned points 33 of the U-shaped spring member 34. The U-shaped spring member 34 has its main body lying flat against a large ornamental piece 35, the rear of which is shown best in Fig. 3, and the U-shaped spring body is secured by spot welding or by solder at the point 36 to the metal body 35. The metal body 35 may be, if desired, provided with retaining lugs 37 for securing a stone 38 or other ornamental device to the main plaque 35.

With the structure shown best in Figs. 3 and 4, the U-shaped spring 34 is relatively large and can be pressed freely along one side to cause the laterally-turned legs 33 to move inwardly so that they may be thus removed from the recesses 32 of the plaque 35. The great advantage of this structure shown is that the U-shaped member 34, instead of occupying substantial space within the plaque, lies flat against the outer portion 30 of the frame and the small openings 32 are sufficient to lock the entire structure to the frame 30. At the same time, the elongated spring body 34 permits the operator to readily contract the spring or allow it to expand in the detachment and securing operations.

In the illustration shown in Fig. 5, I provide a plastic frame 39 having therein an opening 40. On opposite sides of the opening 40 are the small openings 41, and a plate 42 is provided with pins 43 which may be extended through the openings 41 to secure the plate or plaque 42 in position over the opening 40. The plate 42 is then anchored and in position to receive the spring points 33 of the spring member 34 shown in Figs. 1 to 4, inclusive.

Fig. 6 sets forth an ornament structure in the nature of an earring 44 and having carried thereon a plaque 45 provided with openings 46. An ornament 47 is equipped with a U-shaped retainer device 34, as shown in Figs. 1 to 4, inclusive, and the ornament may be attached or detached from the plaque 45 in the same manner in which the ornament is attached and detached in the structure shown in Figs. 1 to 4, inclusive. The ornament structure is likewise applicable to brooches, lockets, rings, bracelets, and a variety of pieces of jewelry. Further, instead of employing a single stone, it will be obvious that a group or cluster of stones may be employed, and that the release in such instances may be effected by the total movement of the trim in disengaging the latch.

While, in the foregoing specification, I have set forth specific structures in considerable detail for the purpose of illustrating the invention, it will be understood that such details of structure may be varied widely by those skilled in the art without departing from the spirit of my invention.

I claim:

1. In combination with a plaque having a pair of openings therethrough, an ornament element having an inner surface adapted to abut the plaque, a U-shaped spring catch having a pair of spring legs extending along said inner surface of said element, said catch being secured to the element at one place so as to provide at least one free spring leg flexible along a plane parallel to the surface of said element, said legs having point portions adapted to be extended through the openings of the plaque to secure said element against said plaque with said surface abutting said plaque.

2. In combination with an endpiece of a spectacle frame having spaced openings therethrough, an elongated ornament element having an inner surface adapted to engage the front surface of said endpiece, a U-shaped spring catch extending along said inner surface and secured thereto at one point so as to provide a free spring leg flexible along a plane parallel to said inner surface, said legs having rearwardly extending point portions adapted to project rearwardly through the openings of the plaque to lock said element against said plaque.

3. In a plastic frame having a recess therein and an apertured metal part extending over said recess, an ornament having a rear surface adapted to engage the front of said metal part, said ornament being equipped with spring legs flexible along a plane parallel to said rear surface and having rearwardly turned end portions adapted to be extended through the aperture of said metal part for locking said ornament upon said frame, said frame recess concealing and enclosing said spring legs when said ornament is locked upon said frame.

4. A spectacle frame having a recess in one end portion thereof, a metal plate secured to said frame and over said recess, said plate having openings therethrough, and an ornament element equipped with a U-shaped spring catch having a pair of spring legs, said legs having rearwardly turned spring points extendable through the openings of said metal part into said recess for locking said ornament element upon said metal plate, said recess concealing and enclosing said spring points.

References Cited in the file of this patent

UNITED STATES PATENTS

| 103,571 | Collins et al. | May 31, 1870 |
| 257,698 | Hawley | May 9, 1882 |
| 2,682,724 | Pattillo | July 6, 1954 |

FOREIGN PATENTS

| 14,372 | France | Nov. 27, 1911 |
| 366,740 | Great Britain | Feb. 11, 1932 |
| 116,256 | Switzerland | Sept. 1, 1926 |
| 359,756 | Italy | July 4, 1938 |